(12) United States Patent
Kasemsuwan et al.

(10) Patent No.: US 11,140,908 B2
(45) Date of Patent: Oct. 12, 2021

(54) REVOLUTIONIZED TUNA PROCESS

(71) Applicant: THAI UNION GROUP PUBLIC COMPANY LIMITED, Samutsakorn (TH)

(72) Inventors: Tunyawat Kasemsuwan, Bangkok (TH); Pieter Berends, Bangkok (TH); Jaturong Kitkumjornkun, Bangkok (TH); Tongkarn Kaewthasee, Bangkok (TH)

(73) Assignee: THAI UNION GROUP PUBLIC COMPANY LIMITED, Samutsakorn (TH)

( * ) Notice: Subject to any disclaimer, the term of this patent is extended or adjusted under 35 U.S.C. 154(b) by 0 days.

(21) Appl. No.: 16/094,832

(22) PCT Filed: Jul. 13, 2016

(86) PCT No.: PCT/TH2016/000061
§ 371 (c)(1),
(2) Date: Oct. 18, 2018

(87) PCT Pub. No.: WO2018/013060
PCT Pub. Date: Jan. 18, 2018

(65) Prior Publication Data
US 2019/0090497 A1    Mar. 28, 2019

(51) Int. Cl.
*A23B 4/005*    (2006.01)
*A23B 4/06*    (2006.01)
(Continued)

(52) U.S. Cl.
CPC .............. *A23B 4/062* (2013.01); *A22C 25/02* (2013.01); *A22C 25/142* (2013.01);
(Continued)

(58) Field of Classification Search
CPC ........... A23B 4/005–4/0056; A23B 4/06–4/07; A22C 25/00–25/08;
(Continued)

(56) References Cited

U.S. PATENT DOCUMENTS 2,373,988 A * 4/1945 Wuori ................. A23B 4/00
426/407
2,493,586 A * 1/1950 Lang ................... A23B 4/00
426/407
(Continued)

FOREIGN PATENT DOCUMENTS

EP   0704159 A2 * 4/1996 ............ A23B 4/023
JP   58-209959 A   12/1983
JP   1-117742 A    5/1989

OTHER PUBLICATIONS

BDoutdoors NPL, https://www.bdoutdoors.com/how-to-clean-tuna/, p. 1-8 (Year: 2015).*
(Continued)

*Primary Examiner* — Drew E Becker
(74) *Attorney, Agent, or Firm* — Seed IP Law Group LLP

(57) ABSTRACT

A revolutionized tuna process according to this invention generally comprising the steps of thawing of frozen tuna, de-heading and degutting, fileting, de-skinning, cleaning of the de-skinned tuna filet, pre-cooking, cooling, packing of the cleaned and pre-cooked tuna loin, and sterilizing the packed tuna loin or freezing the tuna loin. Not only does the process according to this invention reduces the energy utilization by half, it also significantly reduces the time required for cooking and cooling. Therefore, the whole processing time is significantly reduced from at least 8.0 hours in the conventional process to less than 30 minutes.

12 Claims, 4 Drawing Sheets

(51) Int. Cl.
*A23L 17/00* (2016.01)
*A23L 3/10* (2006.01)
*A23L 3/365* (2006.01)
*A22C 25/02* (2006.01)
*A22C 25/14* (2006.01)
*A22C 25/16* (2006.01)
*A23B 4/07* (2006.01)

(52) U.S. Cl.
CPC ............ *A22C 25/145* (2013.01); *A22C 25/16* (2013.01); *A23B 4/0056* (2013.01); *A23B 4/06* (2013.01); *A23B 4/07* (2013.01); *A23L 3/10* (2013.01); *A23L 3/365* (2013.01); *A23L 17/00* (2016.08); *A23V 2002/00* (2013.01)

(58) Field of Classification Search
CPC .......... A22C 25/14–25/185; A23L 3/02–3/14; A23L 3/36–3/365; A23L 17/00; A23V 2002/00
USPC ....... 426/129, 131, 643, 407, 412, 520–524; 99/359–371
See application file for complete search history.

(56) References Cited

U.S. PATENT DOCUMENTS

| | | | | | |
|---|---|---|---|---|---|
| 2,635,050 | A | * | 4/1953 | Stevenson | A23B 4/00 426/262 |
| 2,911,668 | A | * | 11/1959 | Johnson | A22C 25/025 426/480 |
| 2,919,987 | A | * | 1/1960 | Erickson | A23B 4/066 426/506 |
| 2,954,298 | A | * | 9/1960 | Anderson | A22C 25/14 426/402 |
| 3,152,912 | A | * | 10/1964 | Carruthers | A23L 17/00 426/479 |
| 3,180,738 | A | * | 4/1965 | Lassen | A23B 4/066 426/524 |
| 3,593,370 | A | * | 7/1971 | Lapeyre | A22C 25/00 452/106 |
| 3,594,196 | A | * | 7/1971 | Peterson | A23B 4/066 426/523 |
| 3,959,505 | A | * | 5/1976 | Valiant, II | A23B 4/005 426/393 |
| 4,738,004 | A | * | 4/1988 | Lapeyre | A22C 25/00 452/158 |
| 4,810,515 | A | * | 3/1989 | Bourdel | A23B 4/062 426/524 |
| 4,839,181 | A | * | 6/1989 | MacMurray | A22C 25/17 426/237 |
| 5,197,916 | A | * | 3/1993 | Orlando | A22C 25/17 452/125 |
| 5,281,431 | A | * | 1/1994 | Dunckel | A23B 5/0057 426/392 |
| 5,554,069 | A | * | 9/1996 | Burch | A22C 25/145 452/149 |
| 6,099,884 | A | * | 8/2000 | Manfre | A23L 17/00 426/129 |
| 6,210,262 | B1 | * | 4/2001 | Burch | A22C 25/00 452/125 |
| 6,713,104 | B1 | * | 3/2004 | Kowalski | A22C 25/00 426/124 |
| 7,008,657 | B2 | * | 3/2006 | Falk | A23L 13/00 426/233 |
| 2006/0286274 | A1 | * | 12/2006 | Tsai | A23B 4/068 426/643 |
| 2010/0294783 | A1 | * | 11/2010 | Ronsin | A23B 4/005 220/660 |
| 2015/0164096 | A1 | * | 6/2015 | Olivieri | A23B 4/0056 426/56 |
| 2016/0046399 | A1 | * | 2/2016 | Ronsin | B65B 31/00 426/407 |

OTHER PUBLICATIONS

Abstract for CN 105558900A (Year: 2016).*
Translation of CN 105558900A (Year: 2016).*
International Search Report, dated Nov. 15, 2016, for International Application No. PCT/TH2016/000061, 2 pages.

* cited by examiner

| Parameter | Conventional | | Revolutionized Tuna process | |
|---|---|---|---|---|
| | Average | SD | Average | SD |
| Steam tunnel control: Belt speed | N/A | | 6 Hz | |
| Pre-Cooking time | 2 hr | | 21 min | |
| Pre-Cooking temp | 100 | | 100 | |
| Core temp after precook | 64.0 | 2.6 | 89.4 | 2.3 |
| Waiting time before filling | 2-4 hr | | 1 hr | |
| Core temp. before filling | 29.5 | 1.6 | 30.6 | 0.7 |
| %Moisture before filling | 69.2 | 0.8 | 69.3 | 1.2 |
| Gross weight | 205.4 | 2.1 | 206.2 | 1.7 |
| Net weight | 172.0 | 2.1 | 172.8 | 1.7 |
| Fill weight | 120.0 | 0.0 | 120.0 | 0.0 |
| Drain weight | 123.1 | 2.3 | 123.9 | 1.7 |
| %Pick Up | 2.6 | 1.9 | 3.3 | 1.4 |
| %Flake | 7.9 | 1.8 | 3.5 | 2.6 |
| %Oil | 90.4 | 3.1 | 91.0 | 2.2 |
| %Brine | 9.6 | 3.1 | 9.0 | 2.2 |

Figure 3

| Fish/product form | Sensory In France | revolutionized | conventional | Confidence Interval (CI) |
|---|---|---|---|---|
| Skipjack/raw pack | Overall | 5.16±2.21 | 4.79±2.21 | 95% |
| Skipjack/chunks in brine | Overall | 5.15±2.17 | 4.82±2.21 | 95% |
| Skipjack/raw pack | Appearance | 5.43±2.08 | 3.78±2.08 | 95% |
| Skipjack/chunks in brine | Appearance | 5.71±1.78 | 5.34±2.0 | 95% |
| Skipjack/raw pack | Freshness | 5.57±2.04 | 4.99±2.04 | 95% |
| Skipjack/chunks in brine | Freshness | 5.71±1.90 | 5.42±2.03 | 95% |
| Skipjack/raw pack | Texture | 5.14±2.20 | 4.82±2.11 | 95% |
| Skipjack/chunks in brine | Texture | 5.20±2.14 | 4.99±2.22 | 95% |
| Skipjack/raw pack | Taste | 5.42±2.21 | 5.09±2.08 | 95% |
| Skipjack/chunks in brine | Taste | 5.38±2.23 | 4.97±2.21 | 95% |

Figure 4

| Fish/product form | Sensory In UK | revolutionized | conventional | Confidence Interval (CI) |
|---|---|---|---|---|
| Skipjack/raw pack | Overall | 4.53±2.44 | 4.36±2.36 | 95% |
| Skipjack/chunks in brine | Overall | 6.44±1.85 | 5.15±2.36 | 95% |
| Skipjack/raw pack | Appearance | 4.05±2.43 | 2.70±2.10 | 95% |
| Skipjack/chunks in brine | Appearance | 6.77±1.57 | 5.60±1.96 | 95% |
| Skipjack/raw pack | Freshness | 4.74±2.30 | 4.86±2.27 | 95% |
| Skipjack/chunks in brine | Freshness | 6.62±1.50 | 5.73±2.15 | 95% |
| Skipjack/raw pack | Texture | 4.79±2.34 | 4.45±2.29 | 95% |
| Skipjack/chunks in brine | Texture | 6.35±1.77 | 6.20±1.99 | 95% |
| Skipjack/raw pack | taste | 4.71±2.42 | 4.83±2.27 | 95% |
| Skipjack/chunks in brine | taste | 6.57±1.77 | 5.22±2.34 | 95% |

Figure 5

REVOLUTIONIZED TUNA PROCESS

FIELD OF THE INVENTION

The field of invention is related to food science and technology; namely, a new and time efficient process for preparing a packaged tuna product.

BACKGROUND OF THE INVENTION

Traditionally and as shown in FIG. 1, the size-sorted Skipjack tuna is thawed for 3-5 hours in water of 10-20° C. until a backbone temperature of the frozen tuna reaches −5 to +5° C. Tuna is butchered (removing gut) and racked in trollies. The tuna is then transferred to the cookers for pre-cooking which takes between 3.5 and 6 hours including the cooling process. The pre-cooked tuna is cleaned manually for 1.3 hours. The core temperature of tuna loin may reach 20 to 50° C. The overall traditional process is shown in FIG. 1. The longer the process can cause deterioration of freshness, and at the same time, increase chance of microbial growth.

Therefore, there is strong need for revolutionize the process to reduce the time, energy consumption and to improve the quality of the finished products.

SUMMARY OF THE INVENTION

A revolutionized tuna process according to this invention comprises the following steps;
a. Thawing of frozen tuna
b. De-heading and degutting to remove head and gut
c. Fileting to separate backbone, flank and tuna filet
d. De-skinning of the said tuna filet
e. Cleaning of the de-skinned tuna filet to yield raw tuna loin
f. Precooking the said raw tuna loin
g. Cleaning of the precooked tuna loin
h. Pre-cooking said raw tuna loin;
i. Cooling of the tuna loin;
j. Packing of the cleaned and precooked tuna loin; and
k. Sterilization of the packed tuna loin/freezing of tuna loin
wherein the said tuna filet is de-headed, de-gut and de-skinned prior to the pre-cooking step in order to reduce the precooking time and energy. The process according to this invention yields tuna products with lighter color, improved freshness and juiciness.

BRIEF DESCRIPTION OF THE DRAWINGS

FIG. 3 compares the test results of the tuna products obtained from the control process versus the revolutionized tuna process according to this invention.

FIG. 4 illustrates the sensory results obtained from 155 participants in France.

FIG. 5 illustrates the sensory results obtained from 157 participants in the United Kingdom.

DETAILED DESCRIPTION OF THE INVENTION

I. Revolutionized Tuna Process

Figure 1:
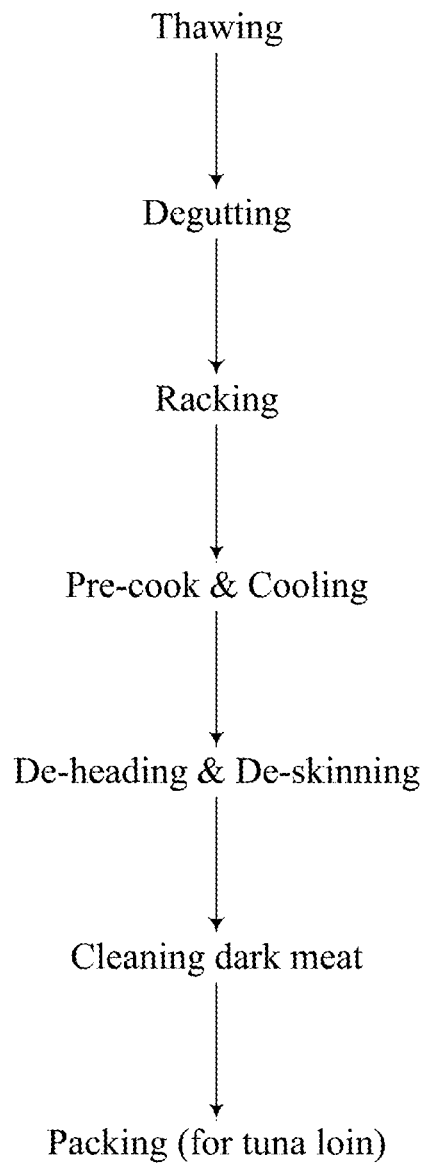
FIG. 1 illustrates a conventional or traditional tuna process which is commonly used in the tuna industry.
Figure 2:
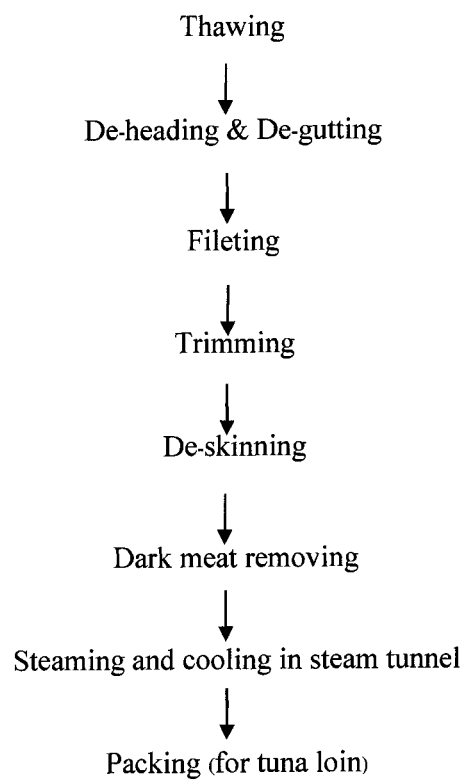
FIG. 2 illustrates a revolutionized tuna process according to this invention.

A revolutionized tuna process according to this invention (in FIG. 2) starts by thawing fish, de-heading and degutting. The said fish are then fileted either manually or via a machinery, yielding at least two filets per fish. A process of trimming and cleaning is then followed to prepare the fish for de-skinning wherein the trimming and cleaning of the pre-cooked tuna loin is done by a knife, an electric knife, a laser, a compressed air, or a water jetter. The dark meat is removed and the filets are ready for cooking in the steam tunnel and cooling with water before being packed into the desired tuna products. This invention reduces the process time significantly from 8.0 hours in the conventional process to less than 30 minutes as shown in FIG. 3. This invention reduces energy utilization for pre-cooking step by not having to cook whole fish and the process removes non-meat part of the tuna prior to pre-cooking. Therefore, the cooking and cooling time is significantly reduced.

In a more detailed embodiment of the revolutionized tuna process according to this invention, the raw tuna, preferably frozen tuna of at least 0.1 kg, most preferably frozen Skipjack tuna between 0.8-6.4 kg, is partially or completely thawed in water until the tuna backbone temperature reaches 0-10° C., preferably 0-4° C. The process of de-heading and de-gutting (i.e. to remove head, gut, dorsal fin, and tail) is then followed. The tuna from previous step is fileted and trimmed to remove all flank bones before conveying to the de-skinning station. The dark meat is then removed.

The pre-cooker equipment, preferably a steam tunnel, is utilized to enable the resulting tuna loin to have good quality from the continuous feeding process that can help to sustain the moisture content in the loin. The core temperature for pre-cooking with the steam tunnel is 50-200° C., preferably at 80-100° C., for the period of 5-40 minutes at the steam input of 80-180 kg/hr to obtain the highest drain weight with low loss of moisture. The pre-cooked tuna loin is then cooled via any cooling systems, such as a continuous process via tunnel conveyor equipped with spraying water and/or cooling air. The preferable loin temperature after cooling is 25-50° C., most preferably 40-45° C. after water spraying and 25-35° C. after air cooling. Preferably, the steam tunneling is a continuous process that can help the tuna to sustain good moisture and diminish the occurrence of curd on the loin by means of conveying the raw tuna loin into the steam tunnel, heating the loin with saturated steam until the temperature reaches 80-100° C., conveying the loin into the cooling system with chilled water spray tunnel to lower the loin temperature to 40-45° C., and cooling the loin with cooling air until the loin temperature reaches down to 25-35° C. before being packed into finished products and sterilization of the packed tuna loin or freezing tuna loin.

II. Quality Assessment of the Tuna Products

The quality of products obtained from the new process according to this invention are assessed and compared with a conventional process with two formulations (in 100% oil and in 100% brine) for feasibility trial. The gross weight, net weight, % flake, drain weight, % moisture, % oil, and % brine of the finished products were analyzed and compared. The results showed that all quality parameters of the tuna products obtained from the novel process according to this invention are comparable with the products obtained from a conventional process.

Furthermore, the quality assessment in relations to the product appearance was also performed. The results showed that the appearance of the product obtained from the revolutionized tuna process according to this invention has lighter color, improved freshness and juiciness than the conventional process as being shown in FIGS. 4 and 5.

Not only does the revolutionized process improves the appearance, but also the freshness, texture and taste of the product. The sensory tests had been conducted on 155 participants from France and 157 people from England separately as are shown in FIG. 4 and FIG. 5, respectively. The sensory tests are done by using the same species of tuna of the same forms (i.e. raw pack or chunk). Products from the revolutionized process scored higher than the products using fish from the conventional process and also scored higher than products of unknown process (data not shown). The sensory test reveals that fish products which had been processed through this invented process are more preferred by consumers than the conventional products of the conventional process in overall liking, appearance, freshness, texture and taste.

III. Effectiveness of the Revolutionized Process

Traditionally, tuna is butchered (remove gut) before the pre-cooking step which takes between 3.5 and 6 hours including the cooling process. It has been reported that approximately 0.32 ton of steam is used to cook one ton of butchered tuna. This invention revolutionizes the process of tuna from cooking the butchered tuna to cooking just the filets. This process reduces the energy consumption by approximately 50%. Based on the knowledge that only 50% of the whole fish yields as the final frozen or canned products, thus, in the revolutionized process, only half of the fish will be cooked since the head, tail, bone, skin, and dark meat are removed prior to cooking step. The process reduces the energy consumption by approximately half of the conventional process. Saving in energy consumption does not only save the cost of production significantly, but also increases the benefit to the environment.

Not only the process reduces the energy use by half, it also significantly reduces the time required for cooking and cooling. Therefore, the whole process time is significantly reduced from 8.0 hours in the conventional process to less than 30 minutes. In conclusion, the revolutionized process as described in this invention is deemed novel in the technical field of tuna production by working with the uncooked fish and up until fileting. Only the filets are cooked and cooled therefore both the time and energy are saved significantly. With less than half hour of processing time, the quality of fish is very much improved as the fish can remain its freshness.

The invention claimed is:

1. A revolutionized tuna process, comprising the following steps:
   thawing a frozen tuna to provide a tuna;
   removing head and gut of the tuna to provide a de-headed and de-gutted tuna;
   fileting the de-headed and de-gutted tuna to separate a tuna filet from backbone and flank of the de-headed and de-gutted tuna;
   de-skinning the tuna filet to provide a de-skinned tuna filet;
   cleaning the de-skinned tuna filet to yield a raw tuna loin by removing dark meet thereof;
   precooking the raw tuna loin to provide a precooked tuna loin, wherein the precooking comprises heating the raw tuna loin with a saturated steam at a steam input of 80-180 kg/hr until a temperature of the precooked tuna loin reaches 80-100° C.;
   cooling the precooked tuna loin, wherein the cooling of the precooked tuna loin comprises directly applying to the precooked tuna loin with a cooling water until a temperature of the precooked tuna loin is about 40-45° C. followed by a cooling air until the temperature of the precooked tuna loin is about 25-35° C., and wherein cooling the precooked tuna loin is performed in a tunnel conveyor equipped with the cooling water and the cooling air;
   packing the precooked tuna loin to provide a packed tuna loin; and
   sterilizing the packed tuna loin or freezing the packed tuna loin,
   wherein the tuna filet is de-headed, de-gutted and de-skinned before the precooking step to reduce the precooking time and energy.

2. The revolutionized tuna process according to claim 1 wherein the cleaning of the de-skinned tuna filet is done before the packing of or before the cooling of the precooked tuna loin.

3. The revolutionized tuna process according to claim 2 wherein the cleaning of the de-skinned tuna filet is done by a knife, an electric knife, a laser, a compressed air, or a water jetter.

4. The revolutionized tuna process according to claim 1 wherein the frozen tuna is partially or completely thawed.

5. The revolutionized tuna process according to claim 1 wherein the thawing of the frozen tuna occurs in water.

6. The revolutionized tuna process according to claim 1 wherein the precooking step is conducted for 5-40 mins.

7. The revolutionized tuna process according to claim 1 wherein the precooking and cooling steps jointly constitute a steam tunneling process configured to sustain a moisture content and diminish the occurrence of curd in the packed tuna loin, the steam tunneling process comprising:
   conveying the raw tuna loin into a steam tunnel where precooking the raw tuna loin is performed;
   conveying the precooked tuna loin into the tunnel conveyor to lower the temperature of the precooked tuna loin to 40-45° C. using chilled water; and
   cooling the precooked tuna loin with the cooling air until the temperature of the precooked tuna loin reaches down to 25-35° C. before packing the precooked loin.

8. The revolutionized tuna process according to claim 1 wherein the process is a continuous process comprising:
   conveying the raw tuna loin into a steam tunnel and precooking the raw tuna loin in the steam tunnel to provide the precooked tuna loin; and
   thereafter, conveying the precooked tuna loin into the tunnel conveyor and cooling the precooked tuna loin.

9. A process for processing a tuna, comprising:
   fileting a tuna to provide a tuna filet;
   removing dark meat from the tuna filet to yield a raw tuna loin;
   precooking the raw tuna loin to provide a precooked tuna loin, wherein the precooking comprises heating the raw tuna loin with a saturated steam at a steam input of 80-180 kg/hr until a temperature of the precooked tuna loin reaches 80-100° C.;
   cooling the precooked tuna loin, wherein the cooling of the precooked tuna loin comprises directly applying to the precooked tuna loin with a cooling water until a temperature of the precooked tuna loin is about 40-45° C. followed by a cooling air until the temperature of the precooked tuna loin is about 25-35° C., and wherein cooling the precooked tuna loin is performed in a tunnel conveyor equipped with the cooling water and the cooling air; and after cooling, packing the precooked tuna loin.

10. The process according to claim 9, further comprising de-heading and de-gutting the tuna prior to fileting the tuna.

11. The process according to claim 9, further comprising thawing a frozen tuna to provide the tuna.

12. The process according to claim 9 further comprising de-skinning the tuna filet before removing the dark meat from the tuna filet.

* * * * *